United States Patent [19]

Fatatry

[11] Patent Number: 4,652,081
[45] Date of Patent: Mar. 24, 1987

[54] OPTICAL MULTI-FIBRE SWITCH

[75] Inventor: Ayman E. Fatatry, Uxbridge, England

[73] Assignee: The General Electric Company, p.l.c., England

[21] Appl. No.: 817,876

[22] Filed: Jan. 10, 1986

[30] Foreign Application Priority Data

Jan. 23, 1985 [GB] United Kingdom ............... 8501623

[51] Int. Cl.⁴ ............................................. G02B 6/36
[52] U.S. Cl. ................................................. 350/96.20
[58] Field of Search ............... 350/96.15, 96.20, 96.21, 350/96.22

[56] References Cited

U.S. PATENT DOCUMENTS

| | | | |
|---|---|---|---|
| 4,076,376 | 2/1978 | Slaughter | 350/96.21 X |
| 4,097,129 | 6/1978 | Wellington et al. | 350/96.15 |
| 4,303,304 | 12/1981 | Ruiz | 350/96.20 |
| 4,415,229 | 11/1983 | McCullough | 350/96.20 |
| 4,512,627 | 4/1985 | Archer et al. | 350/96.20 |

OTHER PUBLICATIONS

Yamamoto et al, "Moving Optical—Fiber Switch Experiment", *Applied Optics*, vol. 17, No. 22, Nov. 1978, pp. 3675-3678.

*Primary Examiner*—John Lee
*Attorney, Agent, or Firm*—Kirschstein, Kirschstein, Ottinger & Israel

[57] ABSTRACT

A switch for switching a single fibre to any one of a plurality of fibres by aligning their end faces is composed of a funnel-shaped guide. The single fibre is mounted in the narrow end portion of the guide and the plurality of fibres are held in the wide end of the guide. Each of the plurality of fibres is independently movable longitudinally into the guide, for example using electromagnetic actuators, so that as a desired fibre moves further into the guide, its end is guided towards the narrow end where it will align with the end of the single fibre.

10 Claims, 8 Drawing Figures

OPTICAL MULTI-FIBRE SWITCH

BACKGROUND OF THE INVENTION

Field of the Invention

This invention relates to switching mechanisms for optical fibres and more particularly to such mechanisms capable of switching one fibre to a selected one of a plurality of fibres.

SUMMARY OF THE INVENTION

Accordingly, the invention provides an optical fibre switch comprising a tapered guide, a single optical fibre positioned at the narrow end of said guide with an end face within the guide and a plurality of optical fibres positioned at or adjacent the wider end of the guide, each of the plurality of fibres being separately movable longitudinally into the guide so that, in use, the end face of any selected one of said plurality of fibres is capable of being guided into alignment with the end face of said single fibre.

The switch preferably also comprises means for producing the movement of each of the fibres forming the plurality of fibres in a longitudinal direction into and out of the guide. The moving means may be, for example, a solenoid with a magnetic element attached to each of the fibres, or alternatively a relay.

The tapered guide may be in the form of a funnel-shaped ferrule or it may be a funnel-shaped cut-out in a substrate. Thus, the ferrule is effectively a three-dimensional guide and the cut-out forms a two-dimensional guide.

Preferably, an index matching fluid is provided in the guide between the end face of the single fibre and those of the plurality of fibres so as to decrease friction, lubricate and increase the optical coupling efficiency.

BRIEF DESCRIPTION OF THE DRAWINGS

The invention will now be more fully described, by way of example, with reference to FIGS. 1 to 7 of the accompanying drawings of which.

DETAILED DESCRIPTION OF THE PREFERRED EMBODIMENTS

Figure 1:
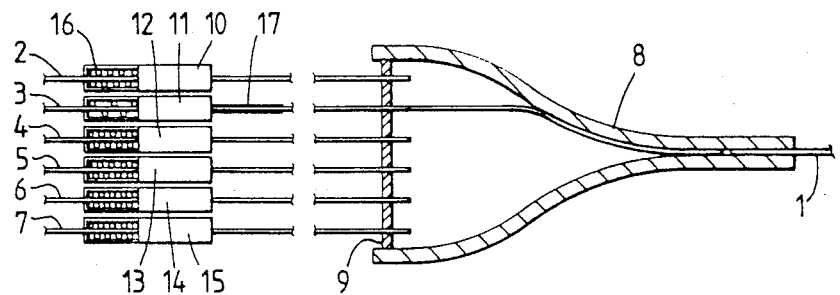
FIG. 1 shows diagrammatically in part cross-section one embodiment of a switch according to the invention in which the tapered guide is a funnel-shaped ferrule.

In the embodiment shown in FIG. 1, there is shown a switch mechanism for switching light between a single optical fibre 1 and any one of a plurality of optical fibres 2–7 (six such possible fibres being shown). The single optical fibre 1 is positioned in the narrow end of a funnel-shaped ferrule 8 with its end face towards the plurality of fibres, the cross-section of the narrow end of the ferrule being such that it closely surrounds the fibre. The wider open end of the ferrule 8 has a guide plate 9 positioned therein. The plate 9 has a plurality of holes in it through which the optical fibres 2–7 are threaded so that the fibres are kept separate from each other in the ferrule 8, as shown.

Each of the fibres 2–7, which is coated in known manner with a protective layer such as polyurethane, passes through a respective solenoid 10–15 and has attached to it magnetic material so that by energizing the solenoid, the respective fibre will be moved longitudinally towards the narrow end of the ferrule 8. Spring means 16 are also provided to return the fibre to its disconnected position when the solenoid is turned off.

In FIG. 1, fibre 3 is shown in the connected position after the solenoid 11 has been energised and has caused the fibre 3 to be moved towards the narrow end of the ferrule 8 due to the coating 17 of magnetic material on the fibre 3. As the fibre 3 is moved, it is guided by the tapering sides of the ferrule 8 towards the end face of the single fibre 1. The amount of movement may be adjusted so that the fibre end faces actually abut each other to form the connection or so that a small space is left between them which may be filled with an index matching fluid which will provide optical coupling between the fibres. Indeed, use of such a fluid will also decrease friction and lubricate the path for the fibre 3 and will increase the coupling efficiency as compared to when such a fluid is not used and the fibres are merely positioned as close together as possible.

Figure 2:
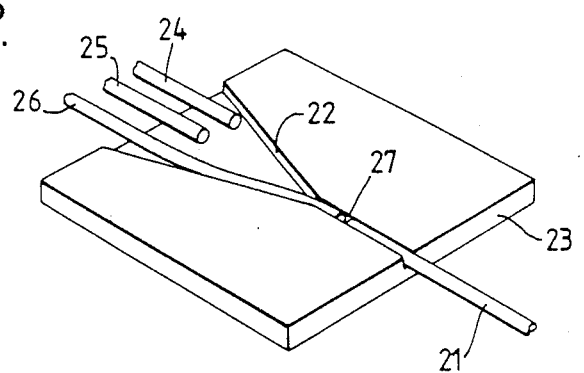
FIG. 2 shows diagrammatically in perspective a second embodiment of a switch according to the invention wherein the tapered guide is a funnel-shaped cut-out in a substrate.

In FIG. 2, there is shown an alternative embodiment of an optical fibre switch according to the invention where a single fibre 21 is positioned in the narrow end of a funnel-shaped cut-out slot 22 in a substrate 23 which may be silica. Several optical fibres 24–26 (only three are shown in the drawing) are positioned in the wider end of the slot 22, and these each have associated with them, means (not shown) to enable each of the fibres to be moved longitudinally in a similar manner to that described above with reference to FIG. 1.

The drawing shows fibre 26 in the connected position where it has been moved towards the fibre 21 and some index matching fluid 27 is provided between the end faces of the fibres in order to increase the optical coupling efficiency as described above.

Figure 3:
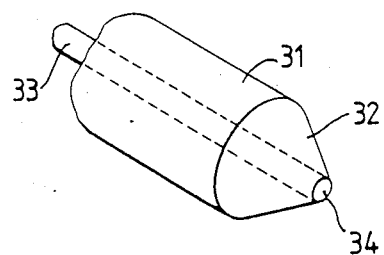
FIG. 3 illustrates on a greatly enlarged scale the end of a fibre suitable for use in the switches of FIGS. 1 and 2.

The protective coating at the end of each of the longitudinally movable fibres of FIGS. 1 and 2, and as shown at 31 in FIG. 3, may be tapered in the manner illustrated at 32, the fibre itself being represented at 33 and the end face, which co-operates with that of the fixed fibre, at 34. The tapering of the coating facilitates the inward movement of the fibres and also tends to reduce the degree of wear which could otherwise take place on the relatively sharper edges of the fibre coatings and give rise to undesirable debris which could in some cases affect the satisfactory operation of the switch.

It will be clear that the switch may be used with any number of fibres at the wider end of the tapered guide provided the taper is made wide enough to accommodate them and it will be appreciated that the switching mechanism according to the invention provides a cheap and simple means for effecting switching between a single fibre and any desired one of a plurality of other fibres.

Figure 4:
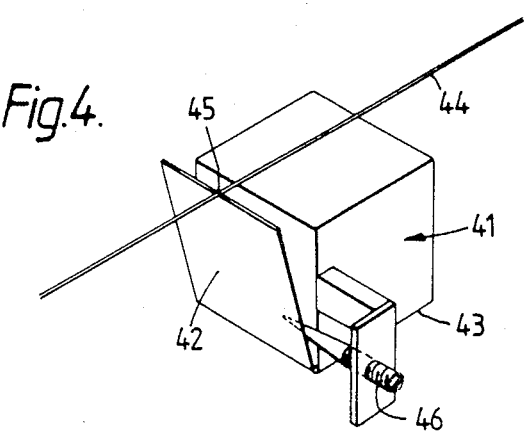
FIG. 4 shows an alternative method of moving the fibres of the switches.

In place of the solenoid a relay may be used to move each of the movable fibres, one such relay being illustrated diagrammatically at 41 in FIG. 4. Thus the armature 42 of the relay is pivoted to the relay housing 43 and is attached to the respective fibre 44 at 45. A conic screw 46 limits the degree of travel of the fibre, and can be adjusted to ensure that the fibre stops just short of the fixed fibre (1, 21 of FIGS. 1 and 2) without abutting it.

Figure 5:
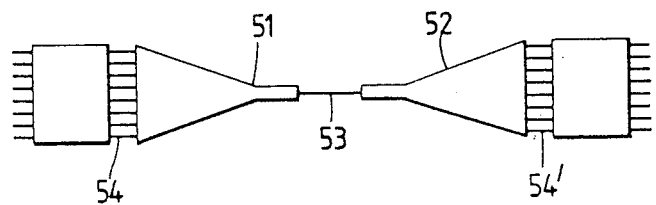
FIGS. 5 to 6, 7a and 7b illustrate three further embodiments of the invention.

A pair of switches 51, 52 may be connected in back to back relationship as shown in FIG. 5, the fixed fibre 53 being common to both switches, so that any one of the movable fibres 54 of one of the switches may be effectively coupled to any one of the movable fibres 54' of the other switch.

Figure 6:
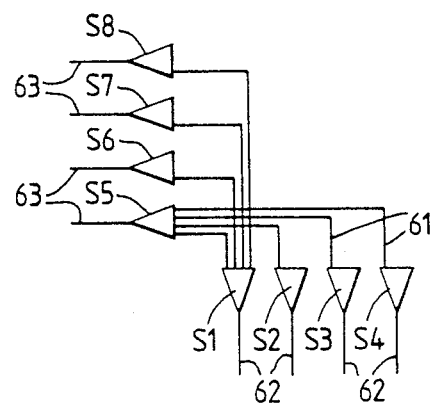

A further manner of utilising a plurality of switches in accordance with the invention is illustrated in FIG. 6. In this arrangement a plurality of fibres 61 are associated at one end with a first set of switches S1–S4 and at the other end with another set of switches S5 to S8, and constitute the longitudinally movable fibres of the respective switches, each of the fibres of a switch of one set being associated with a different switch of the second set, only some of the fibres being shown for the sake of clarity. By this means any of the fixed fibres 62 of one set of switches can be effectively coupled to any one of the fixed fibres 63 of the second set, and several connections between different switches can be made simultaneously.

Figure 7A:
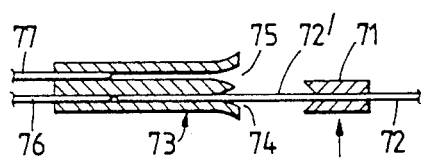
Figure 7B:
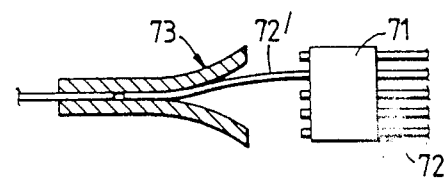

In the embodiment illustrated in FIGS. 7a and 7b, which show sections of the switch at right angles to each other, an auxiliary guide 71 supports a plurality of longitudinally movable fibres 72, and is associated with a funnel member 73 having a pair of funnel shaped guides 74, 75 disposed side by side as shown in FIG. 7a, and each having a respective fixed fibre 76, 77 at its narrower end. Means are provided for transversely displacing either the funnel member 73 or auxiliary guide 71 so that the latter aligns with either one of the funnel guides 74, 75, such that longitudinal movement of a movable fibre 72 i.e. as at 72' causes it to enter one or other of the funnel guides and is guided by it towards the end face of the respective fixed fibre 76 or 77 as the case may be.

In FIG. 7a the fibre 72' is shown within the guide 74, and movement of the auxiliary guide 71 in the direction of the arrow will permit one of the fibres 72 to enter the guide 75.

In some cases it may be possible to move the auxiliary guide 71 into alignment with the other funnel guide 75 whilst the movable fibre 72' remains coupled to the fixed fibre 76 of the first guide 74, to permit another movable fibre to be moved into the other funnel guide 75, so that two movable fibres are coupled simultaneously to the two fixed fibres.

In a further embodiment (not shown) more than two funnel shaped guides, each containing a respective fixed fibre, may be carried by a support which is movable to align with a selected one of the guides into alignment with an auxiliary guide accommodating a plurality of movable fibres, such that any one of the latter can be caused to enter any one of the funnel guides, so as to be guided by it towards the respective fixed fibre.

What is claimed is:

1. An optical fibre switch comprising a tapered guide, a single optical fibre fixed in position at the narrower end of said guide with an end face within the guide and a plurality of optical fibres disposed in inoperative positions at or adjacent the wider end of the guide, each of the plurality of fibres being separately movable longitudinally into the guide so that, in use, the end face of any selected one of said plurality of fibres is capable of being guided into an operative position in close alignment with the end face of said single fibre, and means operatively associated with each of said plurality of fibres for moving a selected fibre into said operative position and for subsequently withdrawing it to its respective inoperative position.

2. An optical fibre switch according to claim 1 incorporating at the wider end of the guide, a guide plate having a plurality of holes through which the fibres are threaded, the fibres being movable relative to the plate in a longitudinal direction into and out of the guide.

3. An optical fibre switch according to claim 1 wherein the means for moving each fibre comprises a solenoid, and an element of magnetic material attached to the fibre, such that energization of a solenoid causes the respective fibre to be displaced longitudinally towards the narrower end of the guide, and the switch incorporates means for automatically returning each displaced fibre from the narrower to the wider end of the guide when the respective solenoid is de-energized.

4. An optical fibre switch according to claim 1 wherein an index matching fluid is provided in the guide between the end face of the single fibre and those of the plurality of fibres. PG,10

5. An optical fibre switch according to claim 4 including stop means for arresting a fibre which has been moved towards the narrower end of the guide in a position in which the end face of the fibre is spaced slightly from the end face of the single fibre.

6. An optical fibre switch according to claim 1 in which each of the plurality of fibres has a coating of plastics material, and the coating at the end of each of the plurality of fibres within the guide is of tapered form.

7. A switching arrangement including two optical fibre switches according to claim 1 disposed in series, with the single fibre common to both switches.

8. A switching arrangement including a first and second set of optical fibre switches according to claim 7, and in which the movable fibres of each of the switches of one set form movable fibres of different switches of the second set.

9. An optical fibre switch according to claim 1 including a further single fibre in a respective tapered guide disposed side-by-side with the first guide, and means for producing a relative transverse displacement of the plurality of fibres or the tapered guides to either one of two positions in which any one of the plurality of fibres can be caused to move longitudinally into either one of the guides so as to align with the single fibre of that guide.

10. An optical fibre switch according to claim 1 including at least one further plurality of fibres, each said plurality of fibres being separately movable longitudinally within a respective auxiliary guide, and means for displacing the auxiliary guides transversely to locate one or another of the plurality of fibres in an operative position adjacent the wider end of the tapered guide, whereby any one of the plurality of fibres in said operative position can be caused to move longitudinally to align with the single fibre.

* * * * *